United States Patent [19]

Bonnett

[11] Patent Number: 5,015,028
[45] Date of Patent: May 14, 1991

[54] HINGE FOR A FOLDING WINDOW

[75] Inventor: Roy E. Bonnett, Birmingham, Mich.

[73] Assignee: Ford Motor Company, Dearborn, Mich.

[21] Appl. No.: 504,368

[22] Filed: Apr. 3, 1990

[51] Int. Cl.⁵ .............................................. B60J 1/14
[52] U.S. Cl. ...................................... 296/107; 16/225
[58] Field of Search ................... 296/107, 146, 147; 16/225 X, 382, 385, DIG. 13

[56] References Cited

U.S. PATENT DOCUMENTS

| 884,067 | 4/1908 | Brunke | 160/230 |
|---|---|---|---|
| 2,025,926 | 12/1935 | Winter | 160/230 |
| 2,560,493 | 7/1951 | Spring | 160/231.2 |
| 2,719,804 | 10/1955 | Carlson | 154/93 |
| 2,750,030 | 6/1956 | Tierney | 206/59 |
| 2,906,657 | 9/1959 | Davidson | 160/84.1 |
| 3,073,734 | 1/1963 | Bemmels | 154/53.5 |
| 3,192,097 | 6/1965 | Abernethy | 161/38 |
| 3,391,050 | 7/1968 | Nebesar | 161/143 |
| 3,996,705 | 12/1976 | Gutierrez | 160/231 |
| 4,551,375 | 11/1985 | Sato et al. | 428/57 |
| 4,741,571 | 5/1988 | Godette | 296/107 |
| 4,761,916 | 8/1988 | Sanok et al. | 49/381 |
| 4,778,215 | 10/1988 | Ramaciotti | 296/107 |
| 4,799,727 | 1/1989 | Robbins et al. | 296/107 |
| 4,885,820 | 12/1989 | Erceg et al. | 16/225 |

Primary Examiner—Robert R. Song
Attorney, Agent, or Firm—Roger L. May; Damian Porcari

[57] ABSTRACT

A hinge is provided for connecting together two adjacent panes in a window of an automobile having a fold-down convertible top. The hinge comprises two separate, opposing lengths of tape, each having transverse reinforcing fibers associated therewith. Each length of tape further includes adhesive on one side thereof for adhering each length of tape onto the opposite edges of the two adjacent panes.

18 Claims, 2 Drawing Sheets

HINGE FOR A FOLDING WINDOW

BACKGROUND OF THE INVENTION

This invention relates to window hinges for flexibly connecting together two adjacent transparent panes. More particularly, this invention relates to an improved hinge having sufficient strength to connect together two adjacent panes in a window of an automobile having a fold-down convertible top.

Automobiles having fold-down convertible tops are well-known in the art. These fold-down tops have traditionally included a rear window in order to provide visibility to the rear of the automobile. Usually the rear windows employed in these automobiles have been made from a flexible plastic material. Rear windows made from a flexible plastic material, however, have tended to become brittle and crack over time. Also, such windows have tended to lose their transparency over time due to discoloration, scratches, and the like.

In view of the disadvantages of plastic rear windows, windows made from other transparent materials, such as glass, have been proposed for use in convertible tops for automobiles. In order to use rear windows made from a non-flexible material, such as glass, the rear windows must be of a size to permit the convertible top to fold-down for compact storage. As an attempt to achieve a permissible size, it has been proposed to use a folding glass window made from two glass panes connected together by a flexible hinge.

Attempts have been made in the past to create a reliable, flexible hinge for connecting together two glass panes for use as a folding rear window in a convertible top. For example, a hinge has been made from an elongated bead of a silicon rubber-based adhesive material or the like bonded between adjacent edges of the glass panes. Unfortunately, this hinge has not been fully successful since it has tended to separate, crack or tear after an inadequate number of folding cycles.

A further attempt at making a flexible hinge for connecting together two glass panes of a rear window for use in a convertible top is disclosed in U.S. Pat. No. 4,799,727. This hinge is made from a unitary extrusion of flexible material having two opposing U-shaped channels joined together by an intermediate hinge segment located to one side of the unitary extrusion. This hinge, however, has the disadvantage of only permitting folding movement of the rear window in one direction due to the location of the intermediate hinge segment. Further, since a substantial amount of stress tending to pull the two panes apart occurs at the hinge when the automobile top is in the up position, the strength of this hinge is questionable because the two opposing U-shaped channels are joined only by the intermediate hinge segment.

Accordingly, there remains a need for an improved flexible hinge capable of reliably connecting together two transparent panes for use as a rear window in a convertible top.

SUMMARY OF THE INVENTION

In the present invention, an improved hinge is provided having sufficient strength to reliably connect together two adjacent transparent panes in a rear window of an automobile having a fold-down convertible top. The improved hinge comprises two separate, opposing lengths of tape, each having adhesive on one side for flexibly connecting together opposite edges of two adjacent transparent panes. Preferably, each of the two lengths of tape is reinforced by transverse reinforcing fibers to enable the hinge to reliably connect together the foldable transparent panes.

In accordance with one aspect of the present invention, a folding window for use in an automobile vehicle having a fold-down convertible top comprises a pair of window panes and pliable strip means for flexibly connecting together the pair of window panes. The pliable strip means allows the panes to move toward one another in either a first or second opposite folding position and includes means for adhering the strip means to the window panes.

The pliable strip means may include means for reinforcing the pliable strip means to permit the strip means to connect together the pair of window panes. The reinforcing means may comprise reinforcement fibers, such as glass fibers, aramid fibers, carbon fibers, metal fibers, cotton fibers or the like, which preferably extend substantially transversely to the length of the pliable strip means.

The pliable strip means may comprise a pair of opposing pliable strips and the adhering means may comprise adhesive on one side of each of the pair of opposing pliable stripes. Further, each of the pair of window panes may be made from a transparent material, such as glass, a polymeric resin, or the like.

In accordance with a further aspect of the present invention, a folding window for use in an automobile vehicle having a fold-down convertible top comprises a pair of window panes and pliable tape means for flexibly connecting together the pair of window panes. The pliable tape means includes means for adhering the tape means to the window panes.

The pliable tape means may include means for reinforcing the pliable tape means to permit the tape means to reliably connect together the pair of window panes. The reinforcing means may comprise reinforcement fibers, such as glass fibers, which extend substantially transversely to the length of the pliable tape means.

The pliable tape means may comprise a pair of opposing pliable tape strips and the adhering means may comprise adhesive on one side of each of the pair of opposing pliable tape strips. Preferably, each of the opposing pliable tape strips is transparent in order to improve visibility to the rear of the automobile. Each of the opposing pliable tape strips may further comprise a silicone-based polymer matrix having means therein for reinforcing the matrix.

Accordingly, it is an object of this invention to provide an improved hinge having sufficient strength to reliably connect together two adjacent transparent panels in a rear window of an automobile fold-down convertible top. This, and other objects and advantages of the present invention, will become apparent from the following detailed description, the accompanying drawings, and the appended claims.

DETAILED DESCRIPTION OF THE PREFERRED EMBODIMENT

Figure 1:
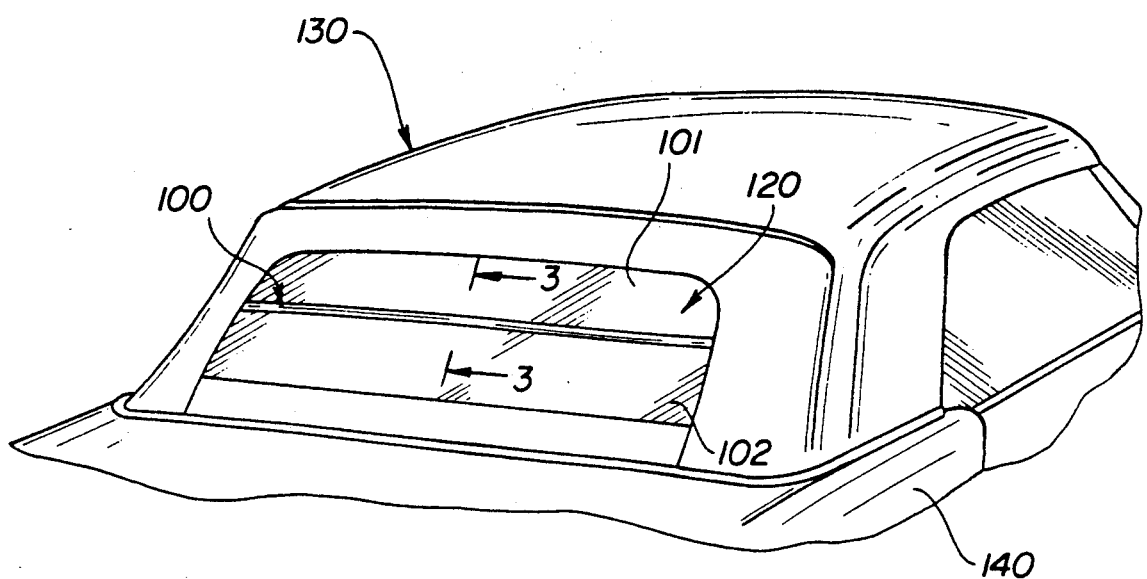
FIG. 1 is a partial perspective view of an automobile vehicle having a fold-down convertible top employing a folding rear window having the improved hinge of the present invention, with the convertible top shown in an up position.
Figure 2:
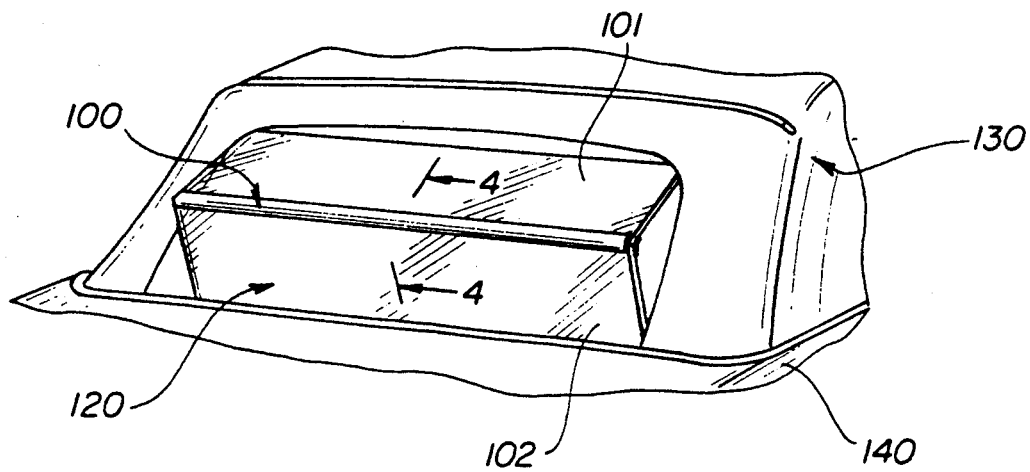
FIG. 2 is a partial perspective view similar to FIG. 1 but illustrating the convertible top and rear window in a partially folded position.
Figure 3:
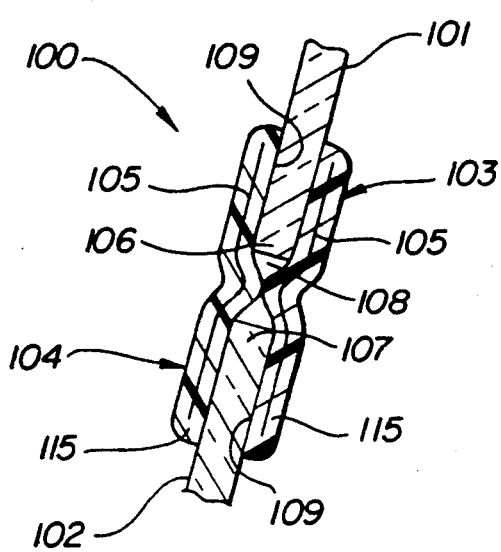
FIG. 3 is an enlarged sectional view of a folding rear window having the improved hinge of the present invention taken generally along line 3—3 of FIG. 1.

Referring to the drawings and particularly to FIGS. 1 and 2, an improved hinge 100 is shown flexibly connecting together an upper window pane 101 and a lower window pane 102 of a foldable window. The foldable window, as shown in FIGS. 1 and 2, may be a rear window 120 of an automobile vehicle 140 having a convertible top 130.

The fold-down convertible top 130 is typically made from a foldable material, such as vinyl, canvas or the like, supported upon a foldable frame (not shown) The fold-down top 130 is capable of being used in an unfolded or "up" position, as shown in FIG. 1, for covering the passenger compartment of the vehicle 140. The fold-down top is also capable of being used in a folded or "down" position for compact storage, thereby exposing the passenger compartment. FIG. 2 illustrates the top in a partially folded condition.

The upper and lower window panes 101 and 102, comprising rear window 120, are capable of being folded together by way of improved hinge 100. By permitting the upper and lower window panes 101 and 102 to fold together, the improved hinge 100 allows rear window 120 to fold-down to a small enough size to permit the convertible top 130 to be stored in a compact position. FIG. 2 illustrates the two panes 101 and 102 folding out and away from the passenger compartment of the vehicle 140. Alternatively, the two panes 101 and 102 may, instead, fold in toward the passenger compartment.

Window panes 101 and 102 are preferably made from a transparent material in order to provide visibility to the rear of the vehicle 140. The preferred material from which the window panes are made is glass since it has very good optical properties, is scratch resistant, and defrosting heating elements (not shown) may be added thereto. Alternatively, the window panes 101 and 102 may be made from a transparent polymeric resin material, such as polycarbonate, an acrylic resin or the like.

As shown in more detail in FIGS. 3-6, the hinge 100 comprises two separate, opposing strips of tape 103 and 104. Both strips of tape 103 and 104 are bonded onto the opposite edges 106 and 10 of the upper and lower panes 101 and 102, respectively. Both strips of tape also adhere to one another in a gap 108 located between the two opposite edges 106 and 107.

Both strips of tape 103 and 104 include a plurality of reinforcing fibers 105. Preferably, the plurality of reinforcing fibers 105 are arranged in a substantially parallel and spaced relation and extend transversely to the length of each of the strips 103 and 104. The transverse reinforcing fibers 105 preferably comprise glass fibers since such fibers are strong, can bend without breaking and are capable of withstanding exposure to the outside environment for an extended period of time. Even though glass fibers are preferred, the reinforcing fibers 105 may comprise other materials, such as cotton fibers, metal fibers, aramid fibers (one of which is sold under the tradename of KEVLAR by E. I. du Pont de Nemours and Co.), carbon fibers or the like. It should be apparent that each strip of tape 103 and 104 may also include, in addition to transversely extending reinforcing fibers 105, other fibers (not shown) which extend in other directions.

Preferably each strip of tape 103 and 104 comprises a silicone-based polymer matrix having the reinforcing fibers 105 located therein. A silicone-based polymer matrix is preferred since it is capable of withstanding exposure to the outside environment for an extended period of time while maintaining flexibility. Even though a silicone-based polymer tape is employed in the described embodiment, it is contemplated that any other tape having reinforcing fibers therein and which is capable of withstanding exposure to the outside environment for an extended period of time could be utilized in the practice of this invention.

The silicone-based polymer matrix 115 includes, on one side thereof, an adhesive 109, such as an acrylic-based pressure sensitive adhesive or the like, for adhering the strips 103 and 104 to the window panes 101 and 102. The silicone-based polymer strips 103 and 104, having adhesive 109 thereon, are applied with pressure for bonding the strips 103 and 104 to the panes 101 and 102.

Figure 4:
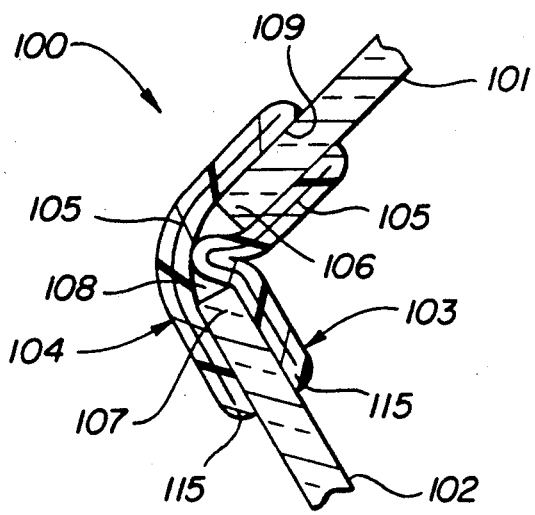
FIG. 4 is an enlarged sectional view of a folding rear window having the improved hinge of the present invention taken generally along line 4—4 of FIG. 2.
Figure 5:
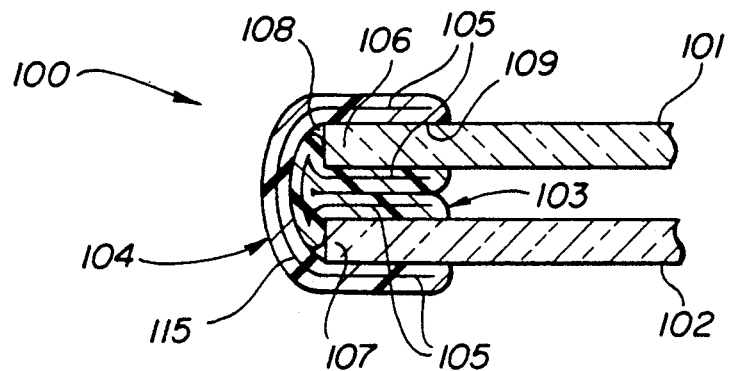
FIG. 5 is an enlarged sectional view of a folding rear window employing the hinge of the present invention with the window being shown in a down (folded) position.
Figure 6:
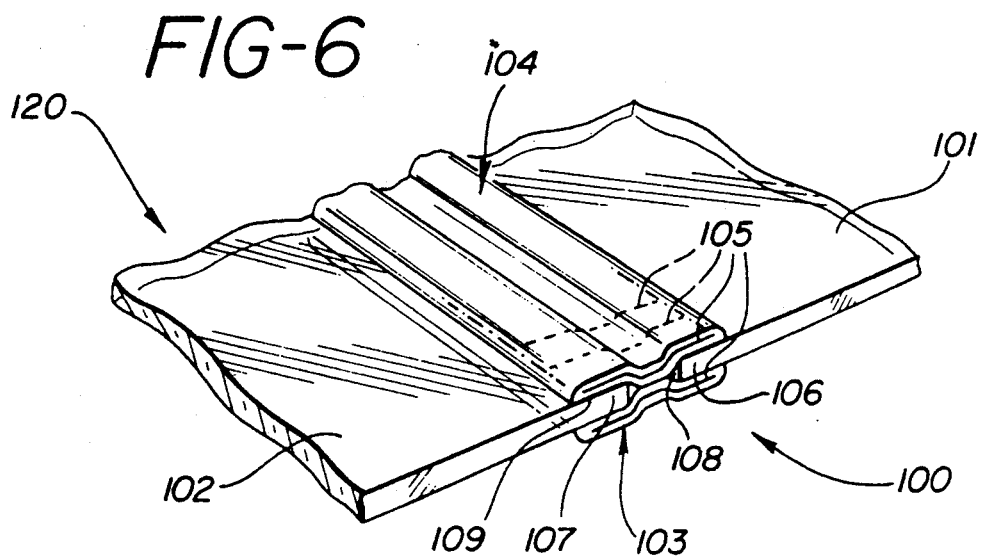
FIG. 6 is an enlarged partially broken out perspective end view of a rear window in an unfolded position employing the improved hinge of the present invention.

In use, the reinforced strips of tape 103 and 104, comprising hinge 100, connect together the upper and lower window panes 101 and 102, as shown in FIG. 1. The reinforced strips of tape 103 and 104 are capable of flexing, as shown in FIGS. 2, 4, and 5 to allow the panes 101 and 102 to move together or apart as the convertible top 130 moves from its unfolded position to its folded position, and visa versa. Since the strips of tape 103 and 104 include a plurality of reinforcing fibers 105, the strips 103 and 104 are capable of reliably connecting together the window panes 101 and 102 for numerous bending cycles without significant risk of separation of either pane from the hinge 100.

While a particular embodiment and details thereof have been shown for purposes of illustrating the invention, it will be apparent to those skilled in the art that various changes in the hinge disclosed herein may be made without departing from the scope of the invention, which is defined in the appended claims. For example, it is contemplated by this invention that the hinge 100 may comprise one strip of tape having reinforcing fibers therein placed either on the passenger compartment side of the rear window 120 or on the side of the window 120 exposed to the environment.

What is claimed is:

1. A folding window for use in an automobile vehicle having a fold-down convertible top comprising:
    a pair of window panes; and
    pliable strip means for flexibly connecting together said pair of window panes, said pliable strip means including means for adhering said strip means to said window panes, said pliable strip means allowing said panes to move toward one another in either a first or second opposite folding position.

2. The folding window of claim 1, wherein said pliable strip means includes means for reinforcing said strip means, thereby permitting said strip means to connect together said pair of window panes.

3. The folding window of claim 2, wherein said reinforcing means comprises reinforcement fibers.

4. The folding window of claim 3, wherein said reinforcement fibers extend substantially transversely to the length of said pliable strip means.

5. The folding window of claim 2, wherein said reinforcing means comprises cotton fibers.

6. The folding window of claim 2, wherein said reinforcing means comprises aramid fibers.

7. The folding window of claim 2, wherein said reinforcing means comprises glass fibers.

8. The folding window of claim 2, wherein said reinforcing means comprises metal fibers.

9. The folding window of claim 2, wherein said reinforcing means comprises carbon fibers.

10. The folding window of claim 1, wherein each of said pair of window panes is made from a transparent material.

11. The folding window of claim 1, wherein each of said pair of window panes is made from glass.

12. The folding window of claim 1, wherein each of said pair of window panes is made from a polymeric resin.

13. A folding window for use in an automobile vehicle having a fold-down convertible top comprising:
a pair of window panes; and
pliable strip means comprising a pair of opposing pliable strips for flexibly connecting together said pair of window panes, said pair of opposing pliable strips including adhering means comprising adhesive on one side of each of said pair of opposing pliable strips for adhering said opposing pliable strips to said window panes, said opposing pliable strips allowing said panes to move toward one another in either a first or second opposite folding position.

14. A folding window for use in an automobile vehicle having a fold-down convertible top comprising:
a pair of window panes; and
pliable tape means comprising a pair of opposing pliable tape strips for flexibly connecting together said pair of window panes, said pair of opposing pliable tape strips including adhering means comprising adhesive on one side of each of said pair of opposing pliable tape strips for adhering said tape strips to said window panes.

15. The folding window of claim 14, wherein each of said opposing pliable tape strips comprises a silicone-based polymer matrix having means for reinforcing said matrix therein.

16. The folding window of claim 15, wherein said reinforcing means comprises reinforcement fibers.

17. The folding window of claim 16, wherein said reinforcement fibers extend substantially transversely to the length of said pliable tape strips.

18. The folding window of claim 16, wherein said reinforcement fibers comprise glass fibers.

* * * * *